Aug. 18, 1964  H. S. SHAW  3,144,906
ROTOR BLADE CONTROL AND MOUNTING APPARATUS
FOR ROTARY WING AIRCRAFT
Filed Dec. 5, 1960  3 Sheets-Sheet 1
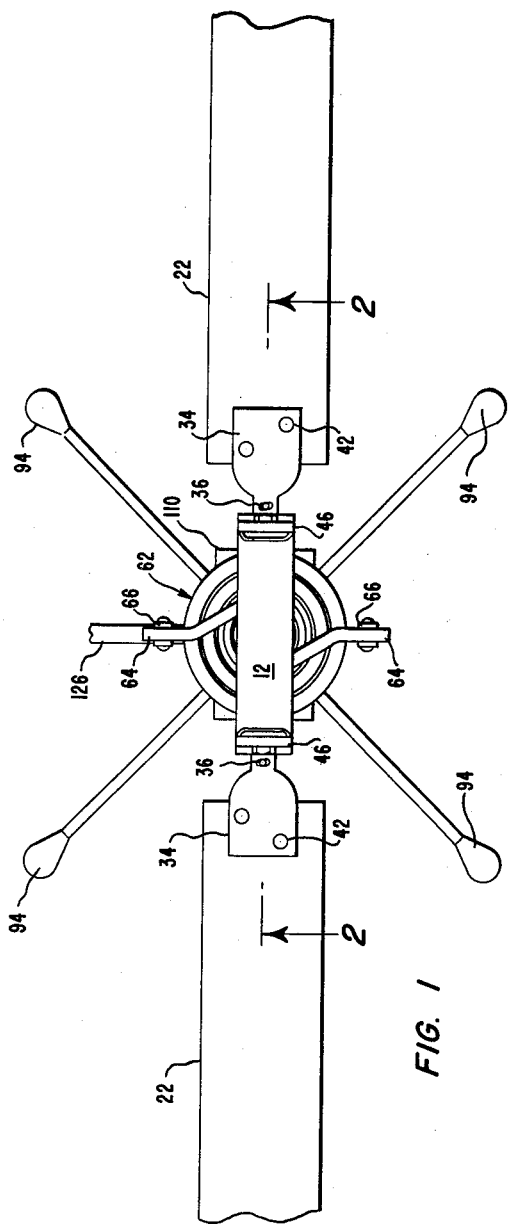
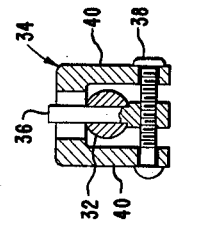
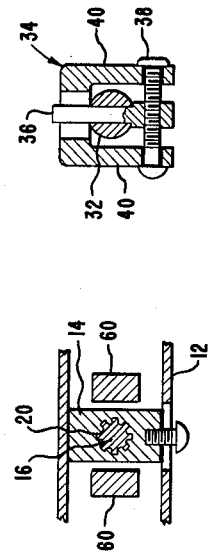
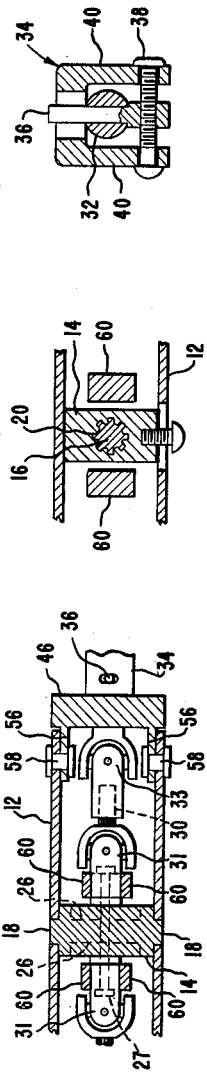
INVENTOR.
HERBERT S. SHAW
BY Fulwider, Mattingly
& Huntley
ATTORNEYS

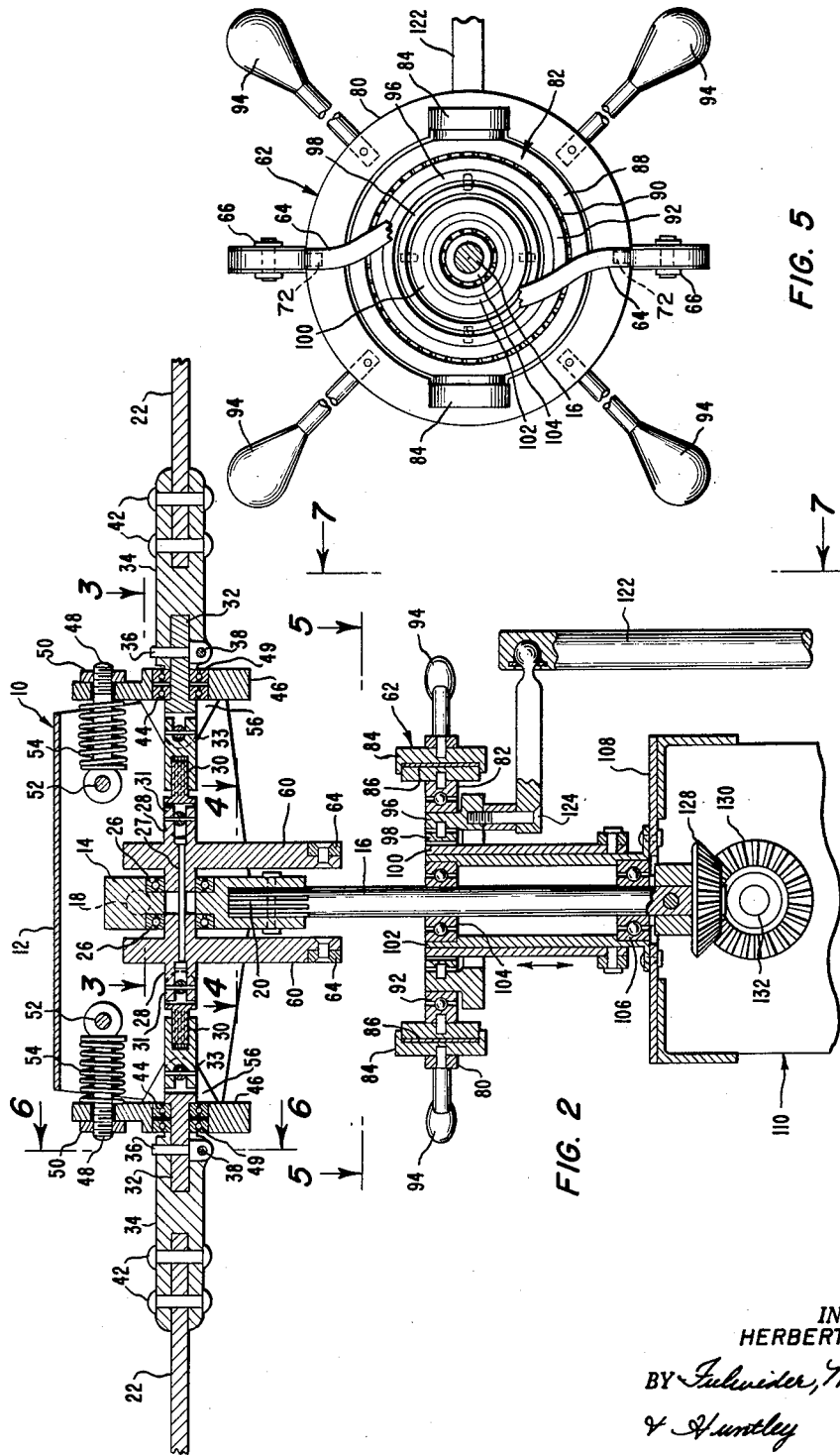

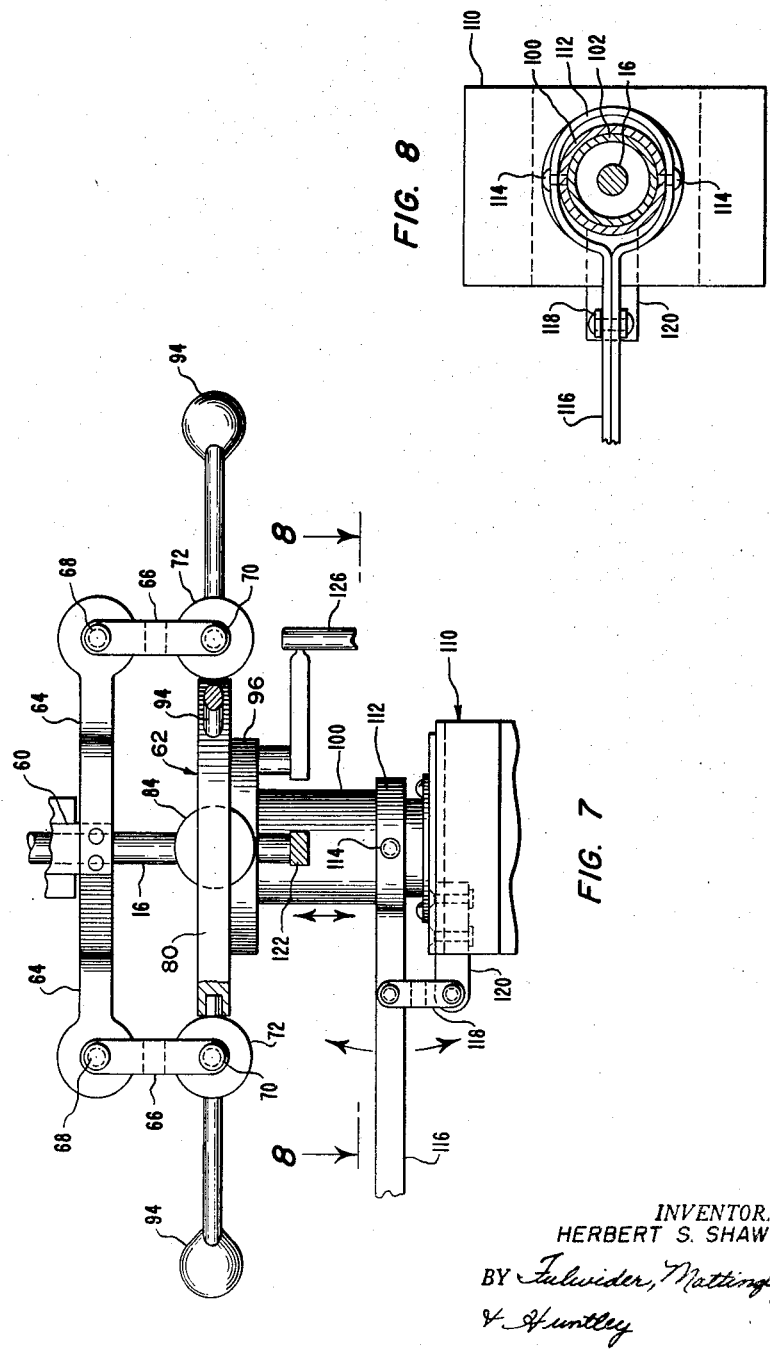

United States Patent Office 3,144,906
Patented Aug. 18, 1964

3,144,906
ROTOR BLADE CONTROL AND MOUNTING
APPARATUS FOR ROTARY WING AIRCRAFT
Herbert S. Shaw, La Mesa, Calif., assignor to Gyrotor
Inc., San Diego, Calif., a corporation of California
Filed Dec. 5, 1960, Ser. No. 73,897
10 Claims. (Cl. 170—160.13)

The present invention relates to rotor blade control and mounting apparatus for rotary wing aircraft.

According to the present invention, the rotative wings or rotor blades are carried by a rotor hub means or housing which is supported by the rotor mast for pivotal movement in a vertical plane which includes the axis of the rotor mast. The blades are individually pivotally attached to the hub housing so that they are also pivotable in the same vertical plane, but about different pivot points than the hub housing. The pivot points for the blades are commonly referred to as flapping pivots, and in the present invention these flapping pivots are underslung, that is, disposed a predetermined distance below the hub housing pivot point. With this arrangement the amount of underslinging and the horizontal distance between the flapping pivots are predetermined so that the horizontal component of the center of gravity for one blade is substantially identical to the horizontal component of the center of gravity of the other blade, as explained in the following example.

More particularly, in a two-bladed, single rotor type of aircraft or helicopter, if the aircraft is moving in a forward direction, the position of a blade at its most forward point of travel will be substantially horizontal, and the rearwardly disposed blade will be disposed upwardly at some angle with respect to the horizontal. It can be seen that if the hub housing were not pivoted to the rotor mast, the horizontal vector of the center of gravity of the forwardly disposed blade would be farther from the mast than the center of gravity of the rearwardly disposed blade, causing a highly undesirable unbalanced condition. However, with the pivoted hub housing of the present invention, the forwardly disposed blade is carried by the hub housing inwardly as the hub housing tilts downwardly on the forward side, and the center of gravity of the rearwardly disposed blade is moved outwardly. A dynamic adjustment of the position of the centers of gravity of the two blades is thus made, compensating for the unbalanced condition which might otherwise exist but for the pivotable mounting of the hub housing to the rotor mast. In addition, since both blades are flap pivoted to the hub housing, and the hub housing is pivoted to the rotor mast, the blades are effectively pivoted about the mast.

The flapping pivot design eliminates any necessity for longitudinal flexing of the blades during operation, the characteristic upward movement of the blades under the combined influence of centrifugal forces and aerodynamic lift forces being accommodated by combined pivotal movement of the blades about their flapping pivots and movement of the hub housing about the mast.

The above discussed structure effectively reduces the imposition upon the mast of unbalanced centrifugal moments. Any tendency of the blades to exert any centrifugal force to apply a moment to the rotor mast which would tend to change its position with respect to true vertical is substantially eliminated, and the structure described permits the blades to move to a position of equilibrium under the influence of the combined centrifugal and lift forces. This avoids the upsetting tendency common in certain helicopters by reason of their rigid blade design. In the latter prior art type of design, the apparently inherent upsetting tendency combines with gyroscopic forces resulting from inertia of the hub housing, and undersirable precession and conical movement of the mast occurs. A great deal of highly objectionable vibration is atendant upon these prior art designs, by establishing a condition of balance between the forces exerted by the two blades, regardless of the instantaneous positions of the blades as they rotate about the rotor mast.

As has been described, the present invention employs a pivoted hub housing together with flapping pivots for mounting the rotor blades to the hub housing. It is an important feature of the present invention to provide a means, in combination with the above, which is operative to effect cyclic and collective pitch adjustment of the blades through what may generally be termed "internal controls," completely eliminating the anciliary action and attendant vibration which is characteristic of prior art designs.

More particularly, the control means comprises an inertia means which is carried by support structure, such as the fuselage of the aircraft, for rotation and universal tilting of its plane of rotation about the rotor mast. Rotation of the inertia means is effected solely in response to rotation of the blades. This unique driving of the inertia means, completely independently of the drive means for the blades, is another important feature of the invention.

The rotating inertia means is a form of wobble mechanism, and is gimbaled for universal pivotal movement about the mast along two axes passing through the rotor mast and at right angles to each other. Control means operable by the pilot are provided for pivoting or tilting the rotatable portion of the wobble mechanism which carries the inertia members. The consequent pivoting or inclination of the plane of rotation of the inertia means effects cyclic pitch adjustment of the blades by reason of means connecting the inertia means to a linkage which is in turn connected to the inner or hub ends of the blades. More particularly, an articulated linkage is connected between the mast and the inner ends of the blades, the linkage including universal joints and extensible members which permit the combined pivotal movement of the hub housing and flapping pivotal movement of the blades. However, the articulated linkage is rotatably adjustable for adjustably altering the pitch of the blades, and includes a portion which is rotatably carried by the mast, but which is not pivotable during flapping of the blades. It is to this portion that the inertia means are connected. Thus, the inertia means is effective to alter the rotated position of the linkage means, but pivotal movement of the blades is ineffective to alter, by ancillary action, the pitch adjustments established by the inertia means. The rotatable, non-pivotable portion of the linkage means is thus a portion of the "internal controls" previously mentioned, in that it is not subject to ancillary movement during flapping of the blades. In contrast, control horns of the prior art are usually mounted in such a way that they are undesirably pivoted when the blades undergo pivotal movement.

Thus, the inertia of the rotating inertia members controls cyclic pitch of the blades, and, since the inertia mass tends to maintain its plane of rotation, small changes or displacements of the helicopter or the rotor itself are not immediately translated into cylic pitch adjustments. Stated another way, there is no feedback for small duration changes, and a smoothing out of forces upon the control means is achieved. It has been found that the apparatus just described achieves a smooth, substantially vibrationless transition of the blades between positions of positive and negative pitch.

Thus, the present invention provides an improved apparatus for effecting cyclic pitch changes for blades carried by a hub housing through flapping pivots, the hub housing itself being pivoted to the rotor mast, whereby undesirable vibration is greatly reduced, necessary pilot control forces are reduced, and a smooth transition is had between various flight attitudes of the helicopter. Ancillary action is substantially eliminated through the use of internal controls, and undesirable vibration is further avoided by driving the inertia means through rotation of the hub housing. The inclination of the plane of rotation of the rotating portion of the inertia means takes place about a transverse gimbal axis which is generally normal to the axis about which the hub housing pivots, and the inertia elements of the inertia means lie on one or the other side of such transverse gimbal axis so that there is a natural, gyroscopic tendency of the rotating portion of the inertia means to gradually assume the altered plane of rotation assumed by the non-rotating portion of the inertia means, all as will be more particularly described hereinafter.

Other objects and features of the present invention will be readily apparent to those skilled in the art from the following specification and appended drawings wherein is illustrated a preferred form of the invention, and in which:

FIGURE 1 is a plan view of the blade mounting structure and pitch control mechanism of the present invention, the body of the helicopter being omitted for clarity, and only portions of the rotor blades being illustrated;

FIGURE 2 is a cross sectional view taken along line 2—2 of FIGURE 1;

FIGURE 3 is a view taken along line 3—3 of FIGURE 2;

FIGURE 4 is a view taken along line 4—4 of FIGURE 2;

FIGURE 5 is a view taken along line 5—5 of FIGURE 2;

FIGURE 6 is a view taken along line 6—6 of FIGURE 2;

FIGURE 7 is a view taken along line 7—7 of FIGURE 2; and

FIGURE 8 is a view taken along line 8—8 of FIGURE 7.

Referring now to the drawings, there is illustrated a blade mounting and control apparatus for a single rotor, two-bladed helicopter, a showing of the helicopter being omitted since it does not form a part of the present invention. The helicopter associated with the apparatus of the present invention is conventional in form, and includes a support structure or fuselage which includes a power plant or internal combustion engine for driving the rotor mast. In addition, such a helicopter conventionally includes throttle controls and directional control means which are coupled by suitable means to elements which are connected to the cyclic and collective pitch mechanism, as will be seen. The helicopter is conventionally provided with a torque compensating tail rotor operated through a shaft which is driven by the power plant.

Referring now particularly to FIGURES 1 and 2, the blade mounting structure 10 includes a hub means or housing 12 which is pivotable in a vertical plane about a bearing housing or hub 14 secured to the upper end of a mast means or rotor mast 16. More particularly, housing 12 is formed into an inverted, U-shaped structure whose depending sides are pivotally supported upon hub 14 at a pair of pivots 18 integral with hub 14, FIGURES 2 and 3. With this arrangement, hub housing 12 is pivotable in a vertical plane which includes the longitudinal axes of the pair of rotor blades 22, and is pivotable about an axis normal to the axis of mast 16.

The lower end of hub 14 includes a splined portion 20 which receives a mating splined portion of mast 16 so that hub 14 is rotatable with mast 16.

Hub 14 is provided with a transverse opening which receives at its ends a pair of oppositely disposed bearings 26 whose inner races have an axis of rotation in axial alignment with the normal or neutral longitudinal axes of blades 22. The inner races of bearings 26 bear against, respectively, pitch adjusting elements or portions 28 of a linkage means 29 which serve to connect the inner ends of blades 22 to hub 14. Portions 28 are constrained against pivotal movement by bearings 26 and are capable of rotational adjustment only. The importance of this feature will become apparent hereinafter. Portions 26 are connected together by a pin 27 which is rotatably carried by portions 26, and which extends through the transverse opening in hub 14.

The outer ends of portions 28 are interconnected, respectively to the inner ends of a pair of slip assemblies 30 by a pair of universal joints 31. Slip assemblies 30 are in turn connected, respectively, to the inner ends of a pair of blade mount pins 32 by a pair of universal joints 33. Slip assemblies 30 each comprise a pair of relatively slidable portions, one splined within the other, so that the mating portions of assemblies 30 are extensible and retractable, but are not relatively rotatable. With this arrangement, rotation of portions 28 is effective to rotate blade mount pins 32, but pivotal movement of pins 32 is ineffective to pivot or rotate portions 28. However, it is seen that regardless of the pivoted position of blade mount pins 32, rotation of portions 28 is effective, through the universal joints 31 and 33, to rotate pins 32, and the extensible connection afforded by assemblies 30 permits outward pivotal movement of pins 32, as will be seen.

The outer ends of blade mount pins 32 are received within mating bores provided in a pair of blade mounts 34, and are each secured in this position by one of a pair of transversely disposed pins 36 which are, in turn, held in position by a pair of transversely disposed shafts 38 arranged through pins 36 and depending sides 40, FIGURE 6, of the blade mounts 34.

The pair of rotor blades 22 are rigidly secured to the outer ends of the pair of blade mounts 34 by a plurality of pins 42.

The inner ends of blade mount pins 32 are formed to include a flange which bears against the inner faces of the inner races of a pair of bearings 44, the outer races of bearings 44 being secured within suitable, axially aligned openings provided in a pair of transversely disposed flap members 46 which form a part of the means for connecting blades 22 to hub housing 12, as will be seen. In similar fashion, the aligned openings in flaps 46 fixedly receive the outer races of a second pair of bearings 49, the inner ends of blade mounts 34 being formed so as to bear against the inner races of bearings 49.

Referring now to FIGURE 6, it is noted that shafts 38 are loosely disposed through the depending sides 40 of blade mounts 34, and that shafts 38 are threadably connected to the lower end of the pins 36. In addition, a clearance space about each pin 36 is provided in its respective blade mount 34 to permit limited transverse movement of the upper end of each pin 36. With this arrangement, the pitch of blades 22 may be adjusted by rotating shafts 38. This adjustment means is used to initially establish the pitch of blades 22 upon assembly of the apparatus of the present invention.

From the above description, it is apparent that the described linkage connecting blades 22 and hub 14 effects pitch adjustment of blades 22 upon rotation of portion 28. Further, flapping movement of blades 22 is ineffective to alter the rotated position of portions 28 whereby undesirable ancillary action upon portions 28 is eliminated.

The arrangement for mounting blades 22 for flapping will next be described. The upper ends of flaps 46 include horizontally aligned openings which receive, respectively, the outer threaded ends of a pair of flap links 48. A pair of nuts 50 are threaded to the outer ends of flap links 48 to aid in securing flap links 48 in the position illustrated. It will be noted that the openings in flaps 46 are slightly larger than the diameter of flap links 48 so that a limited degree of relative vertical movement therebetween is permitted.

The inner ends of flap links 48 are pivotally mounted to hub housing 12 by a pair of horizontally disposed shafts 52, and a pair of helical springs 54 are arranged about the central bodies of flap links 48, respectively, and exert their bias to urge flaps 46 outwardly against nuts 50.

Referring now to FIGURE 3, each flap 46 includes inwardly directed edge flanges 56 which are pivotally connected to the depending forward and rearward sides of hub housing 12 by a pair of pins 58. These pins 58 are sometimes termed "flap pivots," and establish the axis about which blades 22 flap.

With this arrangement, as blades 22 move in a vertical plane about flap pivots 58 to positions of equilibrium under the influence of centrifugal and lift forces, flaps 46 pivot outwardly about shafts 52 and against the bias of springs 54, springs 54 tending to move blades 22 to a normal or equilibrium position in the absence of such centrifugal and lift forces. The axially slidable interconnections provided by slip assemblies 30 permits such pivotal movement of flaps 50, and the articulated connections or universal joints 31 and 33 enable the necessary adjustment of linkage distances to permit such pivotal movement. However, it will be seen that at any position of flaps 46, rotation of portions 28 will be effective to rotate blades 22 about their longitudinal axis to provide a change in pitch of blades 22. The apparatus for effecting such pitch adjustment through rotation of elements 28 will next be described.

Portions 28 each include depending pitch adjusting horns or arms 60 which extend substantially vertically between blade mounting structure 10 and a pitch adjusting mechanism 62. The lower ends of arms 60 are rigidly pinned, respectively, to a pair of elements 64, FIGURES 1 and 7, which are disposed generally horizontally so that vertical movement of the outer ends of elements 64 is effective to adjustably rotate portions 28 for effecting pitch adjustment of blades 22.

The outer ends of elements 64 are offset from their inner ends so that the outer ends are located in opposed relationship diametrically opposite each other in a vertical plane which includes mast 16. The outer ends of elements 64 are pivotally connected to a pair of vertically disposed links 66 by shafts 68, the lower ends of links 66 being pivotally connected by a pair of shafts 70 to a pair of shaft support elements 72 which are pivotally secured to an outer annulus 80, FIGURE 5, of the pitch adjusting mechanism 62. It will be apparent that the inclination of outer annulus 80 dictates the degree of vertical movement of the pair of links 66, and consequently the amount of pitch adjustment of blades 22.

Outer annulus 80 forms a part of an inertia means analogous to a wobble mechanism comprising the outer gimbal or annulus 80 which is gimbal-mounted to an inner annulus 82 by a pair of opposed trunnion mounts 84 which are diametrically opposed on opposite sides of mast 16, the pivot axis of outer annulus 80 including the vertical axis of mast 16. Trunnions 84 each include a clutch element, 86, FIGURE 2, which is effective to damp or modulate undesirable rapid changes in inclination of outer annulus 80 or inner annulus 82.

Inner annulus 82 includes an outer ball bearing race 88, which is secured to the inner portions of trunnions 84; ball bearings 90; and an inner race 92. This construction permits rotation of race 88 and outer annulus 80 about the vertical axis of mast 16, while inner race 92 is rotatably immovable. By reason of the connection of outer annulus 80 to pitch adjusting arms 64, it will be seen that rotation of blades 22 about the vertical axis of mast 16 is effective to rotate outer annulus 80. Outer annulus 80 fixedly carries a plurality, preferably four in number, of inertia elements 94 which extend radially from mast 16, the greater portion of the mass of inertia elements 94 being carried at the outer terminus of the radially extending elements 94. Elements 94 are effective to tend to maintain the plane of rotation of outer annulus 80 in fixed spacial relationship so that spurious or short duration changes in position of the various components of the helicopter will not tend to effect a change in pitch of blades 22.

The particular construction of the wobble mechanism of pitch adjusting apparatus 66 which is effective to alter the position of inner annulus 82, and thus the pitch of blades 22, will next be described. The inner race 92 is rigidly fixed by any suitable means to an actuator ring 96, FIGURES 2 and 5. Ring 96 in turn is gimbaled, along the axis of gimbals 84, to an outer annulus 98 of an inner gimbal which includes an inner annulus 100, the annulus 98 being gimbaled to annulus 100 along a horizontal axis at right angles to the axis of gimbals 84.

Inner annulus 100 takes the form of a vertically extending cylindrical sleeve which is vertically slidable over a stationary, vertically extending and cylindrical sleeve 102. As will subsequently be described, vertical movement of sleeve 100 is effective to alter the collective pitch of blades 22.

Sleeve 102 fixedly carries the outer races of a pair of vertically spaced bearings 104 and 106. The inner races of bearings 104 and 106 are engageable with mast 16 so that rotation of mast 16 is ineffective to cause rotation of sleeve 102. The lower terminus of sleeve 102 embodies a flange which is rigidly secured by any suitable means to the upper structure 108 of the main body 110 of the helicopter.

Referring now to FIGURES 2, 7, and 8 vertical slidable movement of sleeve 110 upon sleeve 102 is accomplished by actuation of a yoke 112 which surrounds sleeve 100 and is pinned thereto by a pair of opposed pins 114. The left end of yoke 112 is brought together to form a horizontally extending control element 116 which may be actuated by the pilot through any suitable control means (not shown). Such control means would be effective to alter the vertical position of control element 116. Control element 116 pivotally carries, as illustrated, a link 118 which is pivotally supported by a support tab 120 fixed to main body 110 of the helicopter. As will be apparent, vertical movement of control element 116 is effective to move yoke 112 and consequently vertically move sleeve 100.

Cyclic pitch adjustment of blades 22 is, as previously stated, effected by tilting or inclining the plane of rotation of actuator ring 96. In FIGURE 2 we are looking forward in the direction of flight, and tilting of the plane of rotation of actuator ring 96 downwardly on the right will cause flight of the aircraft to the right, and, likewise, forward downward tilting of ring 96 is effective to cause forward movement of the helicopter, all as is well known in the art. The means for causing transverse tilting of ring 96 is partially schematically shown by a vertically extending control element 122 which is connected to the usual pilot controls (not shown). The upper end of control element 122 is rigidly connected by a bolt 124 to the underside of ring 96 so that vertical movement of control element 122 is effective to transversely tilt or incline ring 96.

Similarly, a control element 126 is illustrated in FIGURE 7, the upper end of control element 126 being rigidly secured to the under surface of ring 96 at a point 90 degrees away from the point of connection of element 122 to ring 96. Vertical movement of control element 126 is effective to incline or tilt ring 96 along a transverse axis.

From the above description it is seen that the control elements and the wobble mechanism of pitch adjusting apparatus 66 are connected to effect cyclic pitch adjustment about the longitudinal axis of blades 22 and that through aerodyamic and lift forces the blades 22 flap or tilt about flapping points located at shafts 58 to assume a plane of rotation consonant with the cyclic patch adjustment. Overall or collective pitch change is caused by moving sleeve 100 in a vertical direction whereby the pitch of both blades 22 is equally adjusted.

The lower end of mast 16 fixedly carries a bevel gear 128 which meshes with a drive gear 130 carried by a shaft 132 which is connected in any suitable fashion to the usual power plant or internal combustion engine (not shown) of the helicopter.

In the connection with the above description of blade adjusting apparatus 62, it is noted that there is no direct mechanical connection between the control elements and the blades 22, whereby the control elements are substantially free from the comparatively rough cyclic action of the blades 22. Further, it is noted that the response of blades 22 to movement of the control elements 122 and 126 is damped and not rapid so that a pilot is relieved of the burden of fighting his controls.

In the description above, reference axes of the pitch adjusting apparatus 62, the blades 22, and the mast 16, for example, have been used with reference to their neutral positions. Thus, it will be apparent that when an axis is referred to as horizontal, that axis is horizontal in the drawings, but will not of course be horizontal under the various operating conditions.

In summary, it is apparent that fore and aft and transverse directional control is effected by actuation of control elements 122 and 126, and also that actuation of control element 116 is effective to raise sleeve 100 to alter collective pitch of blades 22. That is, each of these control elements effects a change in position of control ring 96, and this change in vertical position or change in inclination is transferred through pitch adjusting arms 60 to effect rotation of elements 28. For example, forward tilting of control ring 96 will cause one of the portions 28 to be rotated to increase the pitch of the blade moving forwardly on the right side, as viewed in FIGURE 2, while the other element 28 will be rotated to decrease the pitch of the blade moving rearwardly on the left. This change in cyclic pitch is repeated with each rotation of mast 16 as pitch adjusting arms 60 adjust their vertical position to conform with their instantaneous location with respect to the inclined control ring 96.

From the above description, it is noted that blades 22 are the sole means for driving the inertia elements of the present device. That is, there is no direct driving connection to the inertia means, the inertia means being rotatable solely by rotation of the blades. With this arrangement there is an exact correspondence between the blade rotation and the rotation of the inertia means, and a corresponding lack of vibration in the interconnection therebetween. It is also noted that the inertia means is mounted in such a way that it has two axes of pivotal freedom, and that the inertia elements of the inertia means are all located on one side or the other of the axis about which the outer ring of the inertia means pivots. With this arrangement of the weights or inertia elements, the weights will always tend to align the plane of rotation of the rotatable portion of the inertia means with the plane of the non-rotatable portion of the inertia means. Further, the pivot axis of the outer ring is coaxial with the normal and neutral axes of the blades so that the action of the inertia means is effective to alter the pitch of the blades as the rotatable portion of the inertia means assumes the plane of the non-rotatable portion of the inertia means.

The apparatus of the present invention includes flap hinging of the blades, as well as pivotal mounting of the hub housing. Further combination with the internal control arrangement provided by portions 28, so that the centers of gravity of the two blades are always positioned to substantially eliminate imbalance, while yet affording a means for pitch control without ancillary disturbances which might otherwise occur by reason of the flapping of the blade.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

I claim:

1. Rotor blade control and mounting apparatus for rotary wing aircraft, said apparatus comprising: support structure; rotor mast means carried by said support structure for rotation about a first axis; pivotal means carried by said mast means for pivotal movement about a second axis transverse to said first axis; a plurality of rotor blades; means pivotally mounting said blades to said pivotal means for flapping of said blades; a pair of linkage means connecting said blades to said rotor mast means for rotative adjustment of said blades about their axes, said linkage means being articulated to permit said flapping; inertia means rotatably carried by said support structure and mounted for universal tilting about said support structure and said mast means; a pair of means connected, respectively, between said inertia means and said pair of linkage means whereby said inertia means is rotated by said linkage means upon rotation of said mast means; and control means connected to said inertia means and operative to alter the plane of rotation of said inertia means to thereby alter the pitch adjustment of said blades.

2. Rotor blade control and mounting apparatus for rotary wing aircraft, said apparatus comprising: support structure; rotor mast means carried by said support structure for rotation about a first axis; pivotal means carried by said mast means for pivotal movement about a second axis transverse to said first axis; a pair of rotor blades; means pivotally mounting said blades to said pivotal means for flapping of said blades; a pair of linkage means connecting said blades to said mast means for rotative pitch adjustment of said blades about their axes, said linkage means each including a portion connected to said mast means and constrained against movement other than rotative movement, said linkage means being articulated to permit said flapping; inertia means rotatably carried by said support structure and mounted for universal tilting about said support structure and said mast means; a pair of means connected, respectively, between said inertia means and said portions of said linkage means whereby said inertia means is rotated by said linkage means upon rotation of said mast means; and control means connected to said inertia means and operative to alter the plane of rotation of said inertia means to thereby alter the pitch adjustment of said blades.

3. Rotor blade control and mounting apparatus according to claim 2 wherein the flapping pivot points of said blades are underslung with respect to the axis of pivot of said pivotal means upon said mast means.

4. Rotor blade control and mounting apparatus for rotary wing aircraft, said apparatus comprising: support structure; rotor mast means rotatably carried by said support structure; a pair of rotor blades; means pivotally mounting said blades to said mast means for flapping of said blades; a pair of linkage means connecting said blades to said mast means for rotative adjustment of said blades about their axes, said linkage means each including a portion connected to said mast means and constrained against movement other than rotative movement, said linkage means being articulated to permit said flapping; inertia means rotatably carried by said support structure and mounted for universal tilting about said mast means; a pair of means connected, respectively, between said inertia means and said portions of said linkage means whereby said inertia means is rotated by said linkage means upon rotation of said mast means; and control means connected to said inertia means and operative to alter the plane of rotation of said inertia means to thereby alter the pitch adjustment of said blades.

5. Rotor blade control and mounting apparatus for rotary wing aircraft, said apparatus comprising: support structure rotor mast means carried by said support structure for rotation about a first axis; pivotal means carried by said mast means for pivotal movement about a second axis transverse to said first axis; a plurality of rotor blades;

means pivotally mounting said blades to said pivotal means for flapping of said blades; a pair of linkage means connecting said blades to said rotor mast means for rotative pitch adjustment of said blades about their axes, said linkage means being articulated to permit said flapping; inertia means rotatably carried by said support structure and mounted for universal tilting about said support structure and an axis coaxial with the axis of rotation of said mast means; a pair of means connected, respectively, between said inertia means and said pair of linkage means whereby said inertia means is rotated by said linkage means upon rotation of said mast means, said support structure including means providing for movement of said inertia means toward and away from said linkage means whereby said portions of said linkage means are rotated equally; and control means connected to said inertia means and operative to alter the plane of rotation of said inertia means to thereby alter the pitch adjustment of said blades, and operative to alter the relative distance between said inertia means and said linkage means to thereby alter the collective pitch of said blades.

6. Rotor blade control and mounting apparatus for rotary wing aircraft, said apparatus comprising: support structure; rotor mast means carried by said support structure for rotation about a first axis; pivotal means carried by said mast means for pivotal movement about a second axis transverse to said first axis; a pair of rotor blades; means pivotally mounting said blades to said pivotal means for flapping of said blades; a pair of linkage means connecting said blades to said mast means for rotative pitch adjustment of said blades about their axes, said linkage means each including a portion connected to said mast means and constrained against movement other than rotative movement, said linkage means being articulated to permit said flapping; inertia means rotatably carried by said support structure and mounted for universal tilting about said support structure and said mast means, said inertia means including an outer gimbal having a plurality of weights mounted thereto, the axis of pivot of said gimbal being generally coaxial with the normal axes of said blades; a pair of means connected, respectively, between said outer gimbal and said portions of said linkage means whereby said inertia means is rotated by said linkage means upon rotation of said mast means; and control means connected to said inertia means and operative to alter the plane of rotation of said inertia means to thereby alter the pitch adjustment of said blades.

7. Rotor blade control and mounting apparatus according to claim 6 wherein said weights are located on opposite sides of the axis of pivot of said outer gimbal.

8. In rotor blade control and mounting apparatus, the combination of: support structure; rotor mast means carried by said support structure for rotation about a first axis; a plurality of rotor blades; means mounting said rotor blades on said rotor mast means for movement of said rotor blades about their longitudinal axes to alter the pitch thereof; inertia means mounted for rotation on said support structure about said first axis and for universal tilting relative to said support structure and said rotor mast means; and means connected between said inertia means and said means mounting said rotor blades for rotating said inertia means and for altering the pitch of said rotor blades in accordance with the plane of rotation of said inertia means.

9. In rotor blade control and mounting apparatus, the combination of: support structure; rotor mast means carried by said support structure for rotation about a first axis; a pluraltiy of rotor blades; means mounting said rotor blades on said rotor mast means for movement of said rotor blades about their longitudinal axes to alter the pitch thereof; inertia means mounted for rotation on said support structure about said first axis and for universal tilting relative to said support structure and said rotor mast means; and means connected between said inertia means and said means mounting said rotor blades for rotating said inertia means and for altering the pitch of said rotor blades in accordance with the plane of rotation of said inertia means, said support structure including means providing movement of said inertia means toward and away from said rotor blades for operating said means mounting said rotor blades.

10. In rotor blade control and mounting apparatus, the combination of: support structure; rotor mast means carried by said support structure for rotation about a first axis; a plurality of rotor blades; means mounting said rotor blades on said rotor mast means for movement of said rotor blades about their longitudinal axes to alter the pitch thereof; inertia means; gimbal means mounting said inertia means for rotation about said first axis and for universal tilting relative to said rotor mast means; and means connected between said inertia means and said means mounting said rotor blades for rotating said inertia means and for altering the pitch of said rotor blades in accordance with the plane of rotation of said inertia means.

References Cited in the file of this patent
UNITED STATES PATENTS

| | | |
|---|---|---|
| 2,030,578 | Flettner | Feb. 11, 1936 |
| 2,415,148 | Sikorsky | Feb. 4, 1947 |
| 2,519,762 | Hoffmann et al. | Aug. 22, 1950 |
| 2,646,848 | Young | July 28, 1953 |
| 3,027,948 | Goland et al. | Apr. 3, 1962 |
| 3,058,529 | Pascher et al. | Oct. 16, 1962 |